C. M. PAXTON.
GYROSCOPIC DEVICE AND METHOD.
APPLICATION FILED NOV. 26, 1920.

1,380,336.

Patented May 31, 1921.
5 SHEETS—SHEET 1.

Inventor
Clifford M. Paxton
By his Attorney

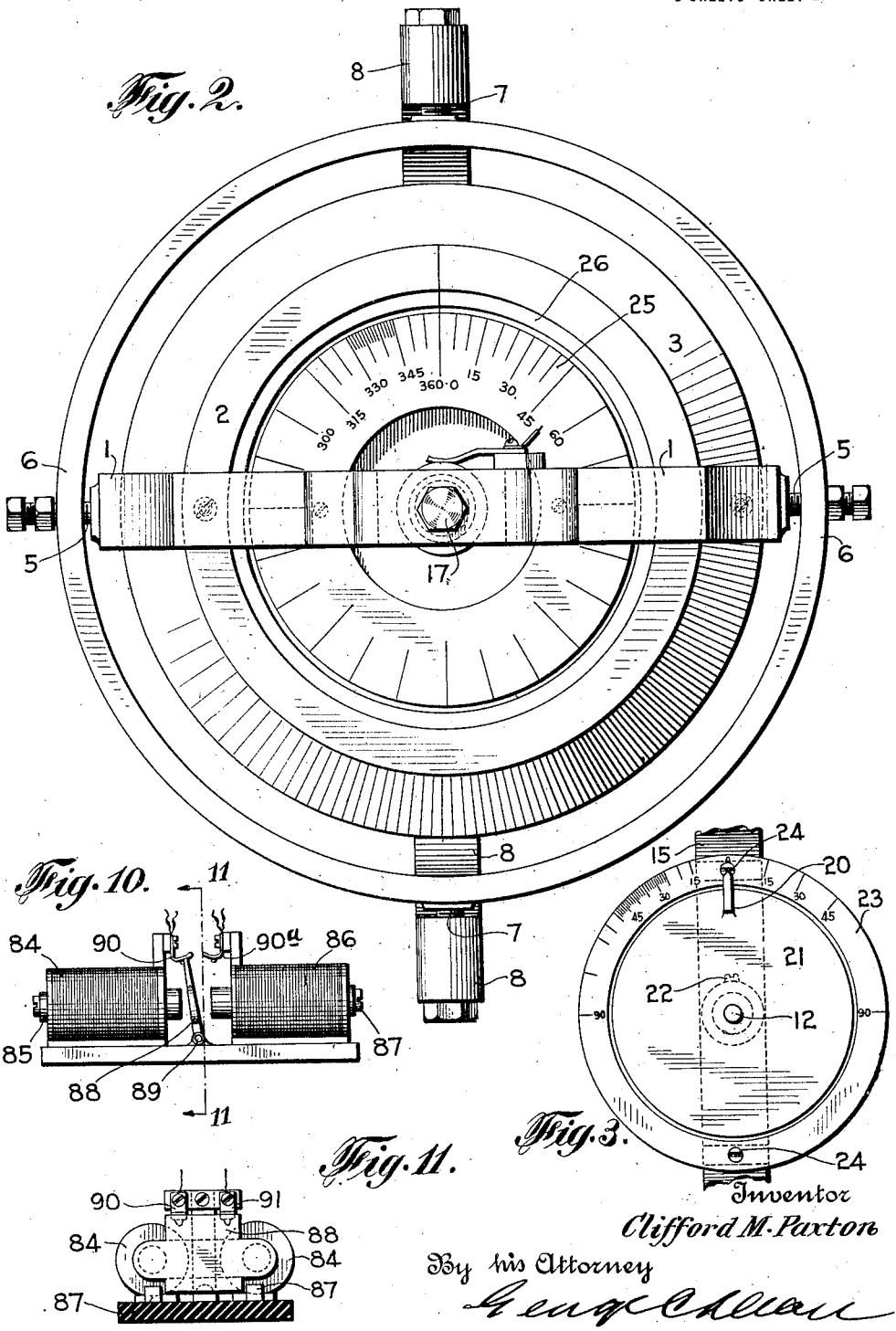

C. M. PAXTON.
GYROSCOPIC DEVICE AND METHOD.
APPLICATION FILED NOV. 26, 1920.

1,380,336.

Patented May 31, 1921.
5 SHEETS—SHEET 3.

Inventor
Clifford M. Paxton
By his Attorney

C. M. PAXTON.
GYROSCOPIC DEVICE AND METHOD.
APPLICATION FILED NOV. 26, 1920.

1,380,336.

Patented May 31, 1921.
5 SHEETS—SHEET 4.

Inventor
Clifford M. Paxton
By his Attorney

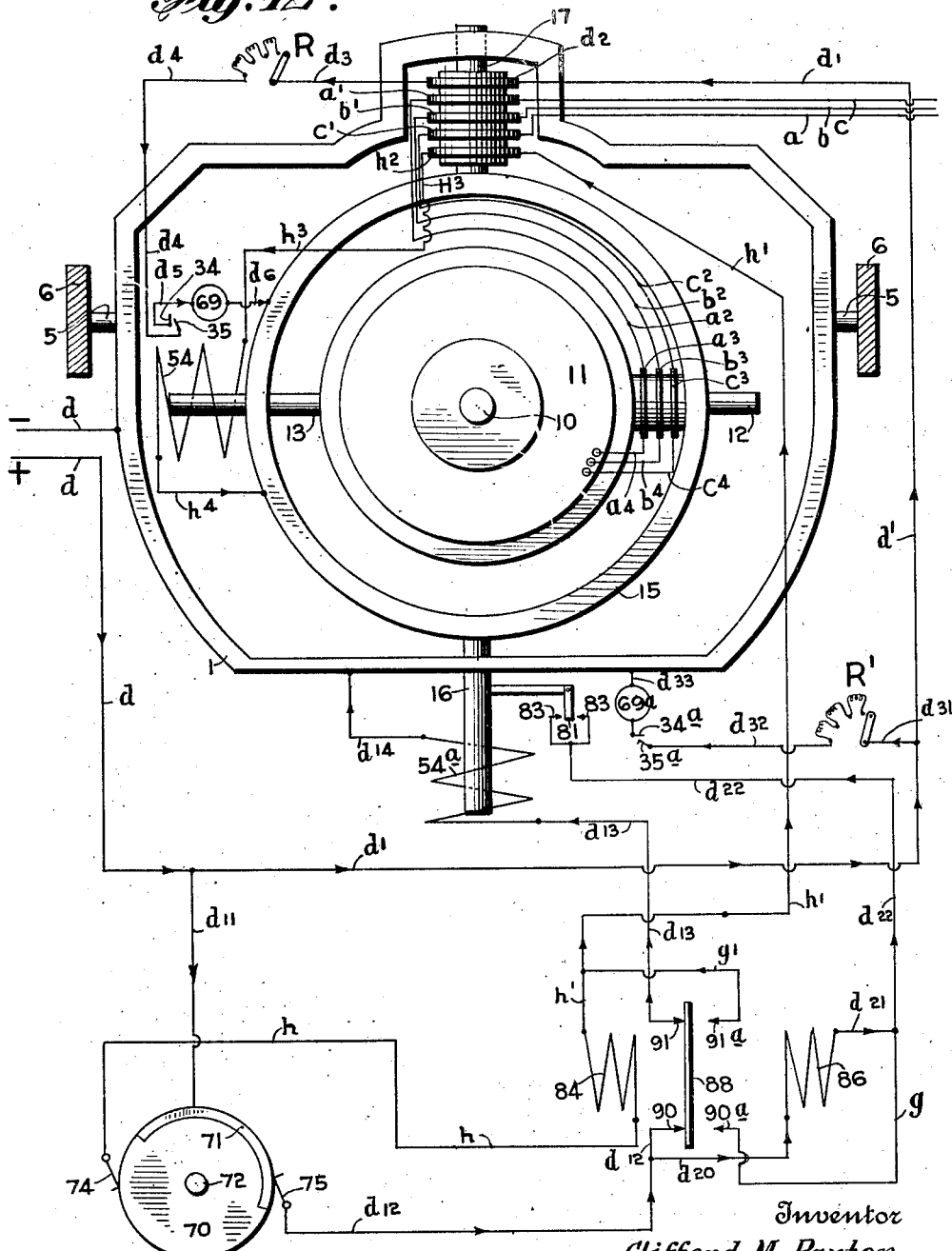

UNITED STATES PATENT OFFICE.

CLIFFORD M. PAXTON, OF BROOKLYN, NEW YORK, ASSIGNOR TO PAXTON GYROSCOPE CORPORATION, A CORPORATION OF NEW YORK.

GYROSCOPIC DEVICE AND METHOD.

1,380,336.  Specification of Letters Patent.  Patented May 31, 1921.

Application filed November 26, 1920. Serial No. 426,600½.

*To all whom it may concern:*

Be it known that I, CLIFFORD M. PAXTON, a citizen of the United States, and resident of Brooklyn, in the county of Kings and State of New York, have invented certain new and useful Improvements in Gyroscopic Devices and Methods, of which the following is a specification.

My present invention relates to a new type of gyroscope compass solving various of the well known gyro compass problems and difficulties, in new ways.

More than fifty years ago Foucault devised a gyroscope provided with a Cardan mounting suspended from a torsionless filament so as to have three degrees of freedom and so as to be balanced in neutral equilibrium. He discovered that when operated with its spinning axis pointing in the fixed direction of the pole star, which is of course a direction parallel with the axis of the earth, the gyro will maintain this fixed direction in space so long as it is kept spinning and it is therefore a satisfactory compass. It was early discovered, however, that when mounted on a ship which must frequently turn about to various points of the compass, there is no wire or other filament that will remain torsionless. Hence there have been many attempts to get an approximately frictionless vertical pivot and because only approximations thereof have been found possible, deflections from the north and south plane by movements of the ship or other support on which the gyro is mounted, have proved unavoidable.

Many forms of so-called "frictionless" pivoting have been devised, notatably floating the gyro mounting on or in a body of liquid, and, more recently, retaining Foucault's torsionless wire, but combining therewith a rotatable support, arranged as a follow-up, operated by a motor, controlled by the gyro unit in such fashion that as soon as the gyro unit puts any twist in the torsionless suspension, the support for the upper end of the wire is motored a corresponding distance in the proper direction to take out the incipient twist. In the case of the follow-up it has even been proposed to eliminate the almost vanished trace of friction, by continuous operation of the follow-up motor to maintain the follow-up support in a state of continuous to and fro movement through a small arc.

Another problem has been to make the gyro pole-seeking. In all known compasses this has been accomplished by arranging the gyro unit to operate in the horizontal plane of the place, or in other words restricting the second of the three degrees of freedom of the Foucault compass. More recently it has been claimed as a discovery that "to fulfil the function of a compass for vehicles it is essential that the wheel frame shall be controlled or restricted, not alone in one plane or with respect to one of its three degrees of freedom as has been wrongly heretofore stated in this art, but also that it be controlled or restrained in a plurality of planes or with respect to at least two of the said degrees of freedom including especially positive control about its vertical axis;" that "the suppression of freedom about two of the three axes of oscillation of the gyro" should be "in proper proportion," and should be "simultaneous."

In all prior commercial gyro-compasses now actually employed in navigation, so far as I am aware, the rotary movement of the earth is applied to the gyroscope indirectly by means of gravity acting upon the gyro through a pendulous element, the mounting being essentially such as to constitute a pendulum upon which the spinning mechanism of the gyro is mounted in vertical pivots. Such mounting permits orienting movement of said spinning axis only in a plane which is maintained approximately horizontal. Such a gyro-compass indicates the horizontal plane of the place and the direction of north and south in said plane. The rotation of the earth on its axis, in so far as it may act on the gyro through friction on the bearings and auxiliary apparatus, is a disadvantage and source of trouble, while gravity, the line of which is ever changing with reference to a gyro relatively fixed in space, is the direct acting and only means of orienting the gyro. So far as I am aware, all of these horizontally-maintained gravity-actuated gyro-compasses function so poorly, are so complex and require such expert adjustment, correction for latitude, speed of ship, etc., and are subject to so many mechanical disorders that their usefulness is practically limited to certain special purposes. Proper functioning is seriously interfered with by the lateral or other motions of the ship upon which it is mounted, due to the angular motions imparted to the spinning axis by swinging of the orienting pendulous mass, and various damping means are employed with a view to reducing the oscillatory and other disturbances of the indication thus caused.

My invention includes departure from every one of these prior principles of operation, although, hereinafter, it will be made obvious to those skilled in the art that certain of my new features and functions relating to the solution of one or more of the problems will be capable of conjoint use in connection with some of the old solutions of the remaining problems. In my preferred device combining my new solutions of all of the problems the following features are to be noted.

First, my device reverts to the Foucault principle in that the gyro unit is arranged to function in a position parallel with the axis of the earth so that normally it points to the celestial poles. In this position it indicates the north and south or meridian plane of the place, and the vertical angle between the horizontal of the place and the direction of the spinning axis is a direct reading of latitude of the place.

Second, to permit this the gyro mounting preferably affords the gyro unit three degrees of real freedom.

Third, the orienting toward the meridian plane is by a new method involving an intermittently and actively applied stress about one axis.

Fourth, only when it is desired to come to parallel, as well as to the meridian plane, is it necessary to operate on two axes, and in such case the operations are preferably successive, wholly on one axis and then wholly on the other axis.

Fifth, in either case the intermittently and actively applied torque is non-positive in the sense that although suddenly applied, it is yieldingly applied, as through forcibly stressing a spring, by an independent or local source of power, as for instance a battery driven rotary or reciprocating electric motor.

Sixth, more specifically described, the spring stresses are symmetrically alternating spring stresses continuing for a time about one axis only, then discontinued, a similar symmetrical alternating spring stress being then applied to the other axis if desired.

Thus orienting to the north and south or meridian plane and to a position of parallel in said plane, is accomplished by operating on the axes, one at a time, (not simultaneously) and only through the medium of an actively applied torque instead of through a restraint.

As a result of this new method of orienting, the power and speed of orientation was, in a recent test, from 20 to say 100 or more times that attainable by prior methods. Hence, I am able to completely discard the Foucault torsionless wire, the mercury float suspension and the motor-operated follow-up of the more recent art, because my orienting power is so great that friction ceases to be a problem. I provide the vertical axis with ball bearings and balance the gyro unit in neutral equilibrium, preferably with respect to both axes of the mounting. Without any other expedients, the orienting power available by my new method is entirely adequate to orient the gyro spinning axis, through a complete quadrant east or west to north in 1/20th or 1/100th the time attainable with compasses having all the antifriction refinements characteristic of the prior art.

According to my preferred method of orienting, the axis operated on is subject to alternating spring stress applied circumferentially, the spring being tensed in one direction, preferably suddenly, to an extent and for a period determined in accordance with principles hereafter explained; then this tension is relieved, and a precisely similar tension applied in the opposite direction. Such alternating stresses are continued for a desired period. In a recent case, alternations at the rate of 20 to 75 per minute were found to be satisfactory, but the times and rates may be varied somewhat according to the weight and speed of the gyro rotor, inertia of the parts, etc.

Such alternating spring stresses applied about one axis, as for instance the horizontal axis, if delivered with a proper degree of suddenness, produce no perceptible dip or yield of the gyro in the direction of the spring stress, but substantially all of the power of said stress is translated into precessional movement of the gyro at right angles to the stress, that is, precession about the vertical axis when the stress is applied to the horizontal and vice versa when the stress is about the vertical axis.

With the spinning axis in the parallel position the spring stresses thus applied produce only slight precessions which are horizontal when the stress is about the horizontal axis, and which are up and down when the stress is about the vertical axis. The same thing is true for stress about the horizontal axis, when the spinning axis is anywhere in the north and south or meridian plane; and the same thing is true for the stress about the vertical axis, when the spinning axis is merely displaced east or west, provided its angle to the horizontal is equal to the latitude of the place.

On the other hand if the spinning axis is deflected, as for instance with its north-seeking end pointing west, the rotation of the earth will soon cause the primarily equal alternating stresses on the horizontal axis to gradually become stronger in the direction tending to raise the north-seeking end of the spinning axis. Hence the precessions toward north become notably longer than the precessions toward the south and an important feature of my discovery is that the asymmetry of the torques and the resulting precessions accumulate and the speed of precession seems to be multiplied by the number of the stresses, as if the whole value of earth torque was applied anew and with full effect in every forward stroke of the spring-tensing device. This is evidenced by the fact that in cases where the alternations of spring stress were about 1 per second, the gyro spinning axis traversed the quadrant from west to north in 90 seconds so that the net movement toward north was about 1° per alternation of stress.

As the gyro mounting affords 3 degrees of freedom, it is quite possible for the gyro spinning axis to yield in the direction of the stress, and I have discovered that such yield may be very great, if the stress is too slowly applied. In practice this will be evidenced by gradual yield or loss of position of the gyro, in the direction of the torque stress, that is, by a gradual net change in vertical angle of the spinning axis with respect to the horizontal. This precaution applies, however, only to the designing of a proper symmetrically acting torque spring and a proper mechanism for suddenly applying the alternating torque thereof in accordance with the principles explained herein. In the completed device no serious yield or loss of position can occur, except in case of some disorder in the mechanism such as commonly requires the attention of a service department.

In connection with the matter of yielding, it is to be noted that in the preferred arrangement the yield resulting from a series of alternations should approximate zero, that is to say, the net precessional movement should be as near as possible at right angles to the torque. If the yield in the direction of the torque is kept less than the accruing earth torque, which is being applied by the earth's rotation at the rate of 1/4 of a degree per minute, the device will continue to orient, but with strength and speed decreasing with all increases of net yield or loss of position. On the other hand the times, rates and amounts of torques and the resistances involved may be such as to result in an apparent net gain of relative position, against the earth torque, thereby giving the effect of an artificially magnified earth torque resulting in stronger and swifter orienting of the gyro. This magnification of earth torque is distinguishable from the multiplication of its effect due to its being suddenly re-applied many times per minute. In many cases the latter effect will be sufficient and there may be a balancing of the several factors involved so that there is neither apparent loss nor gain of position, the net precessional movement being nearly at right angles to the plane of the torque.

It will be found by reference to the prior art that no means has been proposed for accelerating or magnifying the effect of the earth torque on the indicating gyroscope for the purpose of increasing the power and speed of precessional movement in orienting to the meridian.

In prior devices every effort to decrease frictional resistance to precession has been made, but some appreciable friction either in the so-called tortionless suspension or on the follow-up does exist and the result of this resistance to precessional movement is that the movement of the gyro is largely "yield" in the direction of the earth torque and only to a relatively small extent, precession toward the meridian.

As contrasted with this, I utilize a motor or other local source of power to originate and apply reciprocal stresses, first acting with and then against the earth torque. I thus accomplish two distinct things, namely:—

First, I increase the amount and rate of application of the orienting stress in the direction of the earth torque to the point where the resultant movement of the gyro is almost wholly precession, with little or no yield in the direction of earth torque.

Second, in reversing the stress and applying it against the earth torque I may actually get a greater percentage of "yield" per movement through a given arc, on precessions acting against the earth torque than on precessions acting with earth torque, because the net torque in that direction (motor torque minus earth torque) is less in proportion to the resistances than is the net torque in the opposite direction, (which is motor torque plus earth torque).

In such case, it will be apparent that the earth torque is accumulated or stored up and the full effect of the cumulative torque is frequently and actively applied, preferably many times per minute, and by observing the accelerated movement of my gyro the effect of the cumulative torque is easily discernible.

In this way I am able to cause rapid and positive orientation against the frictional and other resistance to precession which may be present in my compass to an extent which would render any prior compasses wholly inoperative.

In some of its aspects, my present method of operation may be viewed as causing the gyro to resist yield and so maintain itself in a plane in space, in a manner distinctly analogous to my method set out in my application, Serial No. 420,372, filed Oct. 29, 1920, covering my so-called meridian gyroscope.

In both cases alternating spring stresses of strictly limited but relatively overwhelming strength, are employed in such a way as to reduce the yield and to magnify the precession in response to slowly applied earth torque; but in the meridian case, the alternating stresses derived from the local source are made initially unequal for the purpose and with the result of making said increased precessions and decreased yields equal and opposite, thus nullifying all effects of earth torque. This same method of decreasing the yield and making the net yield approximately zero, I now employ in connection with initially equal alternating stresses, with the added, otherwise unattainable, result above described, namely, a wholly new method of orienting a gyro compass, whereby the orienting power is enormously multiplied as well as magnified.

Although the gyros covered in this application and the meridian application referred to, are for initially different purposes and function very differently, the means employed are clearly analogous and the two cases are otherwise related.

While the alternating stress operation may be about the horizontal axis only, and may be continuous, I prefer intermittent operation and preferably alternate operation first about one axis to cause precession about the other axis, and then about said other axis to cause precession about said first axis. The intermission of operation in the one case, and in the other case, the shifting of the operation from one axis to the other, is preferably accomplished by means of a timer operating at suitable intervals, say 10 to 30 seconds, or more, or less, according to the power, speed and other characteristics of the instrument.

Another feature of my invention includes automatic means for discontinuing operations about the vertical pivotal axis, in case they happen to be going on at a time when the gyro mounting is turned in asimuth, as by turning of the ship. In such case an automatic self-restoring cut-out is employed, and, if desired, it may be used to shift the stressing operation to the horizontal axis so long as the ship continues turning, or both may be cut out, if desired.

While my present invention is thus revolutionary as to every feature of the prior compass art, certain features are, as before stated, capable of use, with correspondingly less value, in combination with features characteristic of the prior art. For instance, the new method of orienting to meridian plane while preferably executed so as to bring the spinning axis to parallel, that is, to a vertical angle equal to the latitude of the place, may with corresponding disadvantage, be utilized for orienting a gyro compass in the horizontal plane of the place, as is now done in all commercial compasses; or even at a desired unchanging inclination to said horizontal plane. Torsionless wire, mercury, follow-up and vibratory supports for the vertical axis might be employed but as before explained, the enormously multiplied and magnified orienting power which I developed in the gyro, is sufficient to render unnecessary these complicated schemes for avoiding or decreasing friction about the vertical axis of the mounting.

In the prior art compasses very high speeds of the gyro rotor are employed, say 10,000 to 20,000 revolutions per minute, in order to increase its relative stability—that is, decrease the displacement resulting from a given effort and so decrease disturbances and oscillations. In my device the speed of the rotor need be only that of ordinary commercial motors—say 3,000 to 6,000 revolutions per minute.

It will be understood that in the above described uses of my device in connection with a timer, the real movements of the gyro will depend somewhat upon its directional position with reference to the earth's axis at any time, but parallel position is attained by steps which are more or less horizontal and vertical alternately.

When the gyro is in parallel position, rotation of the earth can do no harm through operation of either of the alternating torques because in this position the mounting pivots and the spinning axis carried thereby, are being carried around by the earth without causing any net relative movement. So the net alternating torque being zero cannot cause any angular displacement of the spinning axis and hence there can be no tendency to asymmetric precession and therefore no net movement away from parallel.

My invention may be more fully understood from the following detailed description of one specific embodiment containing all of the above described desirable features, various of which may be omitted if it is desired to make the device operate in accordance with one or the other of the simpler methods above described. In these drawings:—

Fig. 2 is a top plan view of the same;

Fig. 3 is a detail elevation of the parts on the right hand end of the horizontal axis Y—Y, Fig. 1;

Fig. 10 is a side elevation of the same;

Fig. 11 is a section on line 11—11, Fig. 10;

Fig. 12 is a wiring diagram in which principal operating parts of the apparatus are conventionally indicated.

Figure 1:
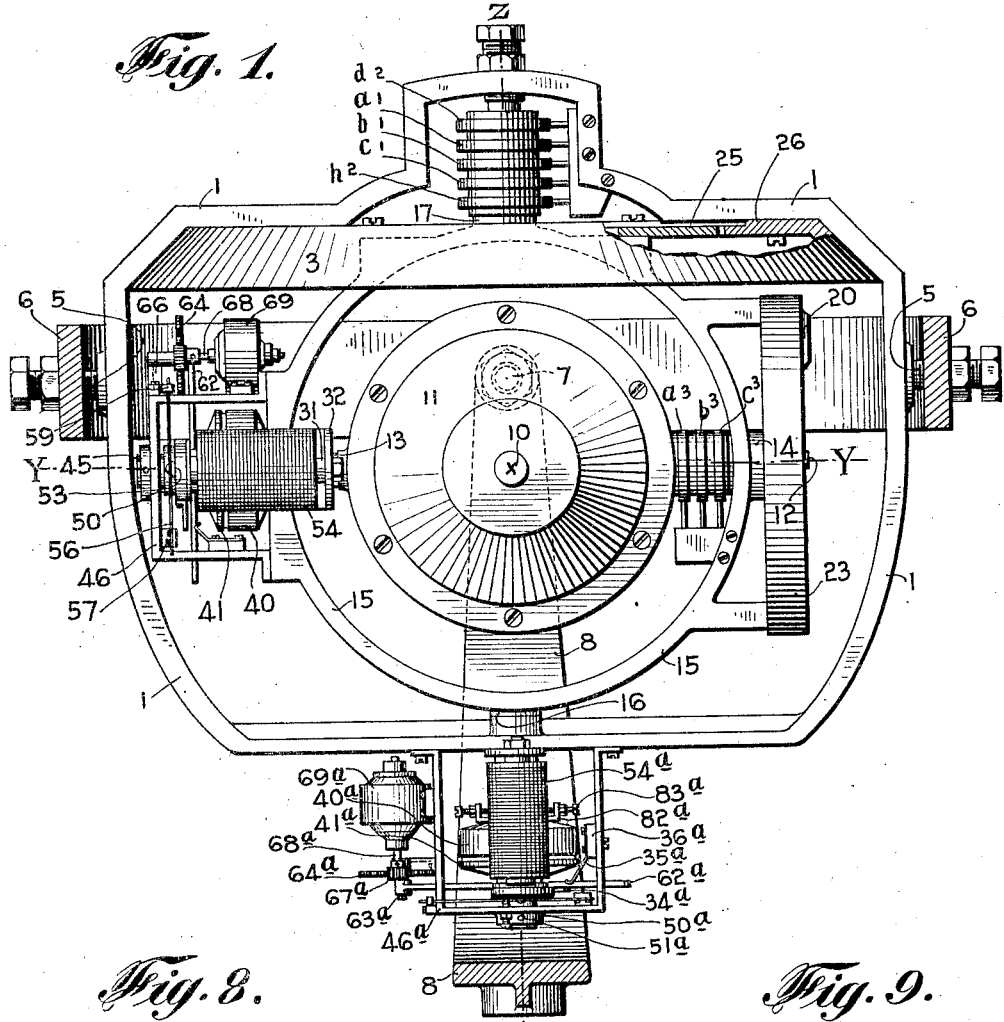
Figure 1 is an elevation of the apparatus, the gimbal mounting being shown in section.

The apparatus comprises an encircling frame member 1 of rigid construction for support of the operating parts which are supported thereby. Secured to frame member 1 and forming a functionally integral part thereof is a circular member comprising a horizontal surface 2, strengthened by a depending conical portion 3. Such frame may be mounted on a solid earth foundation, with the frame-member 1 vertical and the circular member 2 horizontal. If the compass is to be transported, however, or if it is to be used on a ship or other unsteady platform, the ring 1 and circular member 2 may be kept approximately in the earth's verticals and horizontals, as by mounting on horizontal pivots 5, 5 in a horizontal gimbal ring 6 (Figs. 1 and 2), the ring 6 being in turn pivotally mounted on horizontal pivots 7, 7 at right angles to pivots 5, 5. The pivots 7 are in a vertical fork 8 of circular form which may be rigidly secured to the ship or other dirigible body or mechanism in any desired position.

As before explained, such gimbal mounting is merely for purposes of maintaining earth verticals and horizontals, and the three degrees of freedom of the gyroscope are all with respect to vertical frame-member 1 and horizontal member 2, which may be considered as a fixed earth foundation, so far as concerns the direction-indicating functions of the gyro and its functioning within said frame.

Referring to Fig. 1, the end of the gyroscope spinning axis 10 is shown extending directly away from the observer in the horizontal, and 11 is the end of the casing inclosing the rotor and the motor for driving it. The latter parts are not shown, since they may be of any known or desired construction, though for most purposes I prefer to use a three-phase induction motor, with the field stationary and surrounding the spinning axis, and with the armature in the fly-wheel of the rotor.

The first rotary freedom of the gyro is of course free to rotate about the axis X—X of shaft 10, the spinning plane being in or parallel with the plane of the paper.

The second freedom is about the axis indicated by dotted line Y—Y and is afforded by stud-shafts 12, 13, rigidly secured to the gyro casing 11 and supported in bearings 14 in vertical ring 15, through frame 1.

The third degree of freedom is about the axis Z—Z and is afforded by pivotal shafts 16, 17, projecting from ring 15.

The rotor and structure inclosed by and including casing 11 are carefully balanced so that the spinning axis X may rotate about axis Y and may assume and maintain any desired vertical angle, entirely free from any rotative effect by gravity. Similarly, the entire structure supported on the vertical pivots is preferably balanced with reference to the vertical axis Z, so that the system as a whole is universally balanced, as well as universally pivoted in frame 1, 2.

As before explained, the vertical inclination of the spinning axis X indicates latitude. Accordingly, horizontally pivoted shaft 12 is provided with an index 20 on plate 21 rigidly fixed on shaft 12 by screw 22, and vertical mounting ring 15 has a coöperating scale marked in degrees indicating latitude, the scale being on the face of an annular member 23, rigidly secured to projection from said mounting ring 15, by screws 24. This annulus 23 is preferably heavy enough to balance the weight of parts carried by the diametrically opposite side of ring 15.

Ring 15 carries on the upper end of its vertical pivot 16 a disk 25 graduated as a compass card, and ring 26 fixed to horizontal frame-member 2 bears the "lubber line" and such other markings as may be desirable.

The spring stress for orienting the gyro is applied through shafts 13 and 16 respectively, the ultimate effect being a multiplied application of earth torque to the spinning axis. The two sets of spring stressing means, as also the auxiliary apparatus associated therewith, have separate successive functions in the operation of the device. It is therefore desirable to describe them one by one, so that the several functions and methods of operation may be employed either separately or in any desired combination.

Figure 6:
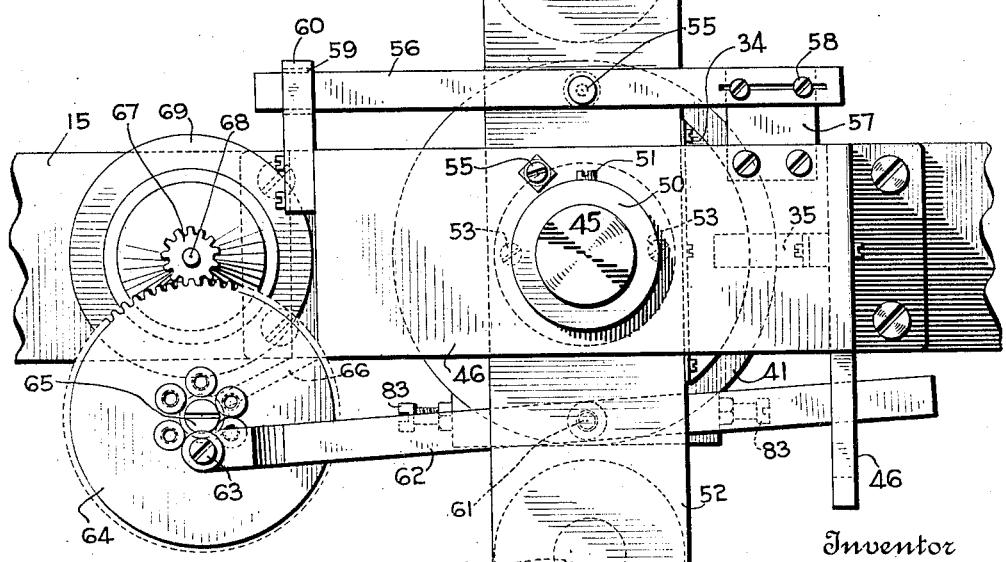
Fig. 6 is an end elevation of the clutch and operating mechanism on the left hand of axis Y—Y, Fig. 1.
Figure 7:
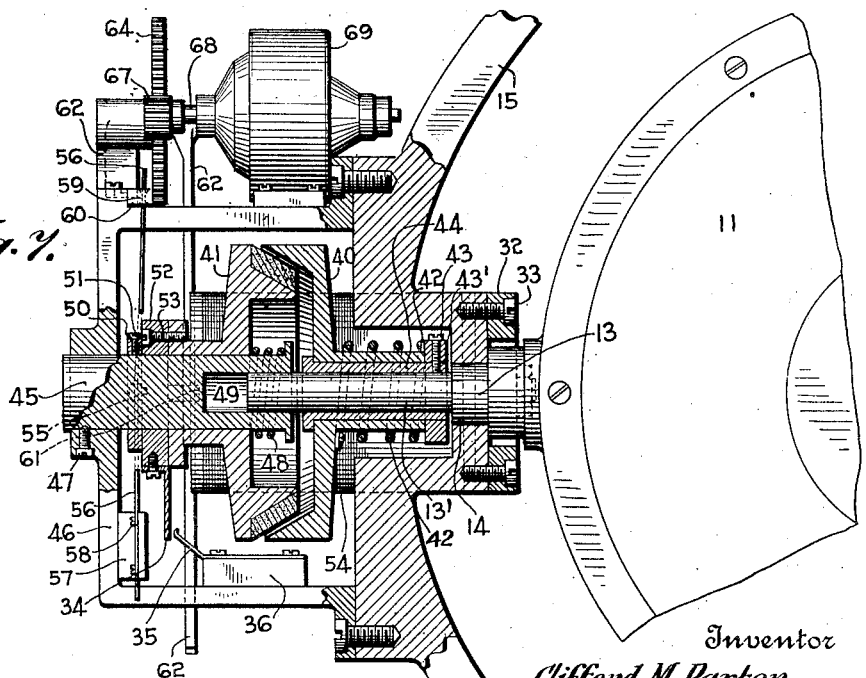
Fig. 7 is a top plan view partly in section showing the same parts as Fig. 6.

Referring to the assembly of parts appearing at the left on shaft 13 of horizontal axis Y, in Fig. 1 and more clearly shown in detail in Figs. 6 and 7:—A reduced portion 13' of shaft 13 carries clutch member 40 resiliently connected through the double acting, symmetrically acting spring 42 with collar 43' locked to shaft 13' by screw 43. Screw 43 also serves to lock the bushing 44 upon which clutch member 40 is mounted for the limited rotation permitted by spring 42 which secured it to fixed collar 43'.

Coöperating with clutch member 40 is an axially movable clutch member 41 rotatably mounted on stud shaft 45, secured in bracket 46 as by screws 47. Bracket 46 is rigidly secured to ring 15. The inwardly extending end of shaft 45 is preferably formed with a recess 49 into which shaft 13' fits. Clutch member 41 is normally pressed out of engagement with clutch 40 by means of spring 48, its rearward movement being limited by collar 50 secured by screw 51. The engagement of clutch member 41 (against the pressure of spring 48) is effected by means of armature 52 which is rigidly secured by screws 53. Armature 52 is controlled by electro-magnet 54, the coils of which are supported from ring 15, through its cores 31 and connecting yoke 32 which is secured to ring 15 by screw 33.

Clutch member 41 is normally held from rotation on shaft 45 by means of a stud 55 (Fig. 6) on spring 56, adjustably secured to support 57 by screws 58 at one end, and having its other end freely movable in slot 59 on support 60. Said stud 55 engages armature 52, which is rigid with clutch member 41. The armature automatically disengages when moved axially to engage 41 with 40.

The clutch member 41 is rocked to and fro alternately on its supporting bracket 46 on vertical ring 15, through stud 61, on link bar 62, mounted on crank pivot 63, on gear 64, mounted on shaft 65, in bracket 66. Gear 64 is driven by pinion 67 on armature shaft 68 of motor 69 on bracket 46. The stop mechanism and stud 55 are arranged to stop the armature in the vertical position, with the crank 63 at mid-stroke to insure equality and symmetry of tensing of spring 42 when the clutch engages and the torque motor 69 begins to rotate. Spring 42 is designed and arranged to afford equal resilient tension when tensed either in the coiling or the uncoiling direction.

Figure 8:
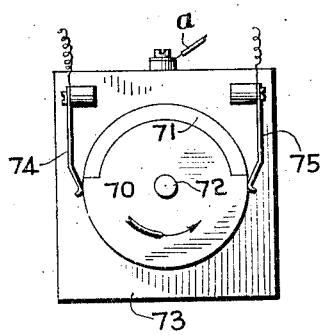
Fig. 8 is a detail view of the "timer" for cutting in and out the circuits of the clutches.

The operation of this assembly will be controlled by flow of current through electro-magnet 54 according to the operation of the timer shown in Fig. 8. This timer comprises an insulating disk 70 having a conducting segment 71 mounted on a shaft 72, driven by any suitable motor or clockwork in casing 73. Conducting segment 71 is connected with a battery or other source of operating current through wire *a* and the cicurit is completed through oneone of the brushes 74 or 75 and electromagnet 54. Only the horizontal axis assembly being now in operation, only one of the brushes will be utilized.

In operation, the conducting segment 71 will close the circuit part of the time and the non-conducting part of disk 70 will open the circuit part of the time.

The rotating shaft 68 of the motor 69 operates the reciprocating link 62 through gears 67, 64, and this causes the armature 52 and the clutch member 41 to rock through an arc equal to the throw of crank 63, and this rocking movement, transmitted through 40, applies torque alternately and in opposite directions to spring 42, and through it to horizontal axis 13. The rocking movement of the armature 52 is permitted by release of the automatic stop 55 when magnet 54 attracts the armature to move the clutch 41 into engagement with 40, the return movement of the armature reëngaging the automatic stop with the crank 63 in the mid-stroke position, so that when the clutch 41 reëngages, the strokes will tense the spring equally in both directions. These armature movements bring contact 34 on armature 52 into engagement with spring contact 35 on insulated support 36 on bracket 46 to close a circuit and start motor 69 after the clutch is fully engaged.

The equal alternating spring stresses on shaft 13, operate to apply earth torque whenever the spinning axis is displaced. If the throw of the crank 63 were small enough and the earth torque could become great enough, stress of spring 42 might become mainly or wholly one-direction pulsation. In the preferred operation, however, the times of engagement of the clutch are short and the throw of the crank is sufficient to keep the torque strongly alternating, the earth torque appearing merely as a slightly longer stroke in one direction than in the other.

The alternating spring stresses are preferably applied at the rate of say 20 to 75 cycles per minute, or more or less, the frequency being such as to produce short horizontal precessions of the spinning axis at the same frequency as the torque reversals.

The rates and amplitudes of such horizontal movements of the spinning axis will depend on the amount, suddenness and duration of the spring stress, and on the weight of the parts to be moved, on the power of the gyro, and on the friction in the mountings, but with any given gyro a desired small amplitude of oscillatory precession can be obtained by changing the torque as by adjusting the speed of the motor, the throw of the driving crank or the strength of spring 42. The effect may be further modified by substituting for the crank a cam or other well known machine element designed to apply the torque more suddenly and to keep it more uniform for a longer arc of rotation of gear 64, or an electro-magnet or other non-rotary source of power may be employed.

The desired adjustment of the suddenness, strength, duration and frequency of the torque reversals, with respect to the resilience of spring 42 and with respect to the characteristics of the gyro can be readily effected in practice, the several factors being much more easy to take care of than it would be to discover and understand each of them. If the reciprocations tend to get in step with the natural oscillatory period of the device or any of its parts, any resulting disturbance may be eliminated in any of the well known ways, as by adjusting the speed of the motor or weighting to change the natural frequency of the oscillating body or element; and in case it is the pendulous mass as a whole, suitable dash pots may be provided to damp oscillation about the gimbal pivots 5 and 7.

The crank which applies torque somewhat gradually and allows intervals of little or no torque, is illustrated herein merely as typical of one well-known means of changing rotary into reciprocating motion, and as being one which I have successfully employed in actual practice.

In this connection it may be well to note that precessional movement of the gyro mass results in acquired momentum, the same as any other rotary movement does. But in a theoretically perfect frictionless gyro it is evident that after discontinuance of a precession-producing torque (which torque for illustration we may suppose is downward and causing precession toward west), any subsequent momentum movement in the same direction as the precession is an application of force toward the west and the west movement is in fact "dip" causing a secondary precession upward, which in turn is a "dip" causing horizontal precession in the reverse direction, which is in turn a "dip" downward (in the direction of the original torque), which in turn becomes a "dip" in the direction of the original precession. This closed curl may be transversed almost instantly if there is little or no friction, and little or no actual movement may be noticeable. It is evident, however, that the secondary precession upward is in the opposite direction to original downward displacement and requires reversal of direction of movement of the horizontal pivot and the load carried thereby. If the load is too great, the upward precession is prevented; thus an essential of gyroscopic reaction is lacking, and the precessional momentum may expend itself in horizontal movement due to "precessional momentum". Modified effects will be produced where the load is not prohibitive. The above are matters that are most easily taken care of by adjusting the above described variables.

The constant, slight, precessional oscillation of the spinning axis is advantageous in many ways:

First: The reversing torque is applied under conditions most favorable for making the precessional oscillations approximate the theoretical right angle to the torque. The earth torque then operates through these efficient, already established, precessions to make them extend a little farther on the moves toward the meridian plane than on the moves away from the meridian plane, the yield or loss of position in the direction of the earth torque is always smaller than the accruing earth torque; and, as we have seen there may be no net loss at all.

Second: The full force of the earth torque is applied repeatedly, many times per minute, and the pecularity of the gyro is that such renewed applications of torque have the effect of producing repeated additional precessions, so that the speed of orienting in response to a given earth torque is enormously multiplied, as compared with the precession produced by such earth torque slowly applied.

It is possible to take care of all unknown angles and directions of spinning axis deflection by merely applying the above described alternating stresses to the horizontal axis Y to cause precession of the spinning axis toward the meridian plane; then releasing the restraint to permit "translation" of any vertical deflection into a horizontal deflection; and then reapplying the restraint on the horizontal axis to bring the spinning axis to the meridian plane. Preferably, therefore, the timer 70 is designed and operated to apply the alternating stresses on the horizontal pivot only long enough to permit a substantial precessional movement of a few degrees or even a fraction of one degree, leaving intervals during which any vertical component of the deflection may be reduced or eliminated by "translation". This method operates rapidly to bring the spinning axis to the meridian plane, where it is kept by the recurring stresses and precessions, alternating with the slight translations during free intervals. Ultimately, all vertical deflection is translated to horizontal and corrected by horizontal precession, thus bringing the spinning axis to parallel with the earth axis and giving correct latitude. But in the meantime the device is a good compass, giving substantially correct indications of north.

By this method, the intermittent torque applications operate alternately to make short step-by-step corrections by precession about one axis and then translation about both axes. Any and every deflection in any direction will thus be taken care of and the alternate steps will operate to bring the spinning axis to parallel.

In actual practice, this short step method is particularly desirable because when the spinning axis is once in parallel, the deflections are likely to be small and as little time as possible should be wasted in correcting them, particularly the horizontal components of the displacement, because these are compass errors that can be quickly corrected by horizontal precession. It may be of advantage for the further reason that the magnified earth torque applied many times per minute may cause the gyro to overswing the meridian plane, and frequent intermissions will operate to cut these short.

A general idea of what I mean by "translation", may be had by considering a gyro at the equator with the north-seeking end of its spinning axis deflected 45° west of the true north. It is evident that if it maintains its fixed direction in space, a quarter revolution of the earth will carry it to a position where the direction of its spinning axis cuts the earth's axis at an angle of 45°. It then lies in the true north and south or meridian plane of the place, even though it is inclined in that plane at a 45° angle. In the same way, if the original deflection had been 45° downward as well as 45° west, the line of the spinning axis would be carried into the meridian plane of the place and would cut the earth's axis at the same 45° angle, but it would require only one-eighth revolution of the earth to effect such "translation." If, during such translation, the spinning axis is caused to precess upward, through the required 45° angle, it will then be in exact parallelism with the axis of the earth spinning in its natural plane, unaffected by torque of the earth and indicating latitude as well as north.

When the assembly on the vertical shaft 16 is used, instead of being removed or disconnected as has been thus far assumed, vertical precession operates alternately with horizontal precession, as the method for bringing the spinning axis vertically to parallel as well as to the meridian plane. Such vertical precession can be used alternately with precession and translation, in the same way described for horizontal precession, but where both assemblies are used, the spinning axis may be brought to parallel as quickly as to the meridian plane alone. Hence the instrument becomes as quick for indicating latitude as for indicating north, and the indications of both will be in general more accurate and more stable, because parallel is the natural rest position of the spinning axis.

The assembly on the vertical axis is shown as including parts which in number, size, shape and functions are identical with those above described for the assembly on the horizontal axis. These parts are shown on a somewhat larger scale in Figs. 4 and 5, but this is for clearness and for the purpose of making it easier to show an added feature referred to below.

Figure 4:
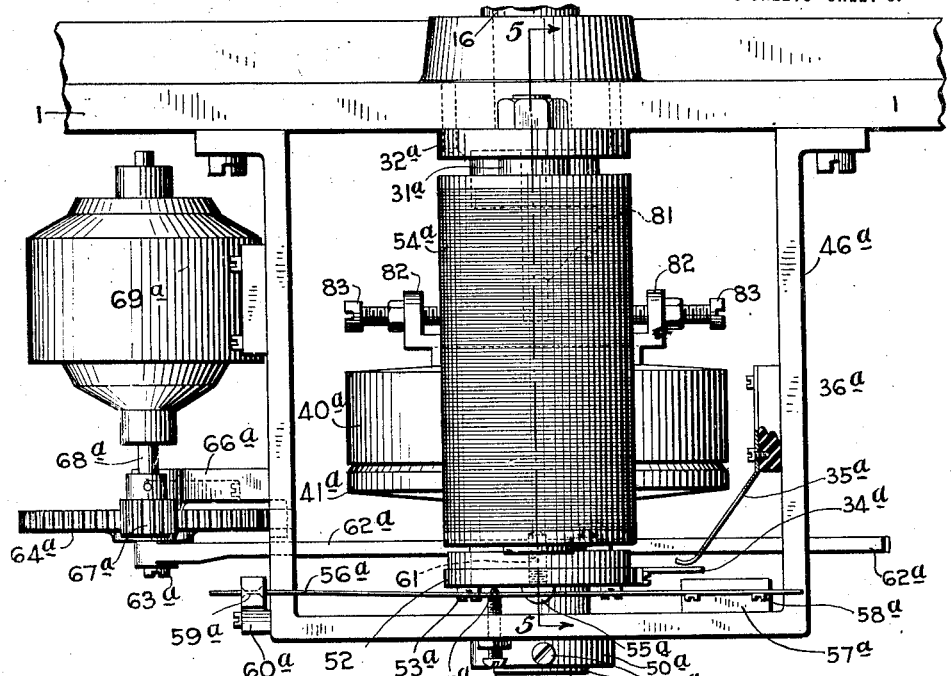
Fig. 4 is a plan view of the clutch and operating mechanism at the lower end of the vertical axis Z—Z, Fig. 1.
Figure 5:
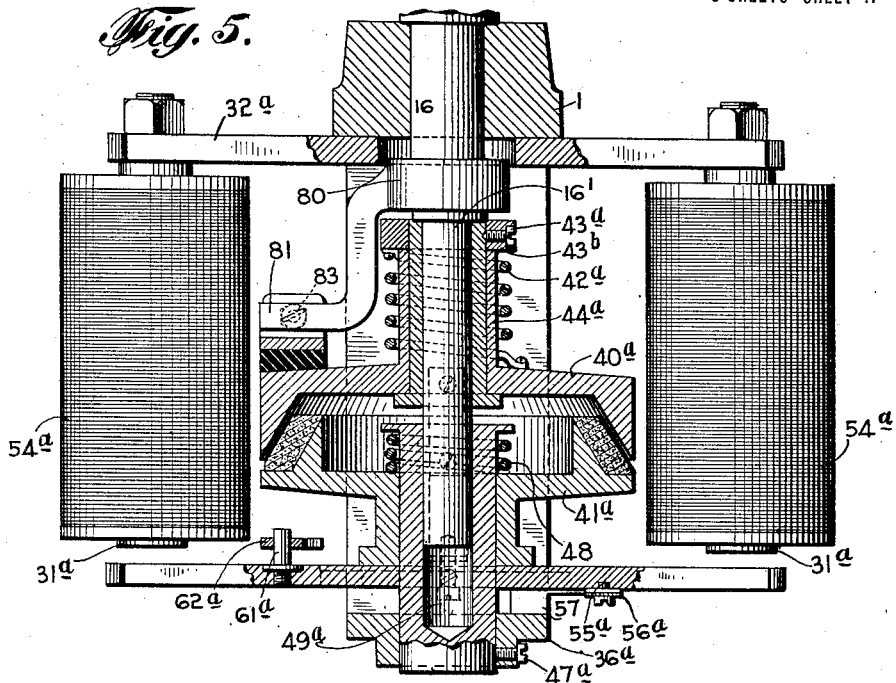
Fig. 5 is a section on the line 5—5, Fig. 4.

The identical parts for the vertical axis have been lettered in Figs. 1, 4 and 5 with the same reference numerals as used for the horizontal assembly, except that numerals have the letter $a$ as an index or exponent. Hence a detailed description may be had if desired by simply reading the foregoing description, vertical shaft 16 taking the place of horizontal shaft 13 and fixed frame 1 taking the place of vertical frame 15.

In normal operation of the two assemblies, the timer operates through contact brushes 74 and 75 alternately, cutting in magnet 54 and motor 69 for a time, while brush 74 contacts with conducting segment 71; and then, when such segment passes out from under brush 74 and engages brush 75, the circuit of magnet $54^a$ and motor $69^a$ is cut in. The length of closure of each circuit may be widely varied but should be at least long enough to permit accumulating a desired value of earth torque as a substantial component of the stresses which are actively applied through springs 42 and $42^a$; and the times required for this may be relatively short, say ten or twenty seconds. In certain cases there may be a more or less substantial interval when both assemblies are cut out.

Thus organized, the two assemblies operate alternately, the vertical assembly operating to cause the spinning axis to move vertically to parallel by precession and the horizontal assembly operating as before to cause precession horizontally toward the meridian plane. This makes the instrument indicate latitude as quickly as it indicates north besides improving the steadiness and accuracy of both indications.

This method has the disadvantage, however, that a ship or similar dirigible platform on which it may be used is likely to turn or change its course during a time when the vertical clutches are in, so that the turning movement of frame 1 about the vertical axis will carry vertical shaft 16 and ring 15 with it, thereby rotating the spinning axis horizontally away from the meridian plane, and causing vertical precession.

The above mentioned additional feature in the assembly on the vertical axis takes care of this difficulty. It consists of a member on the vertical shaft 16 which is adapted to make contact and close circuit through an adjustable stop located on clutch member $40^a$. As shown in Fig. 5 this comprises a collar 80 on shaft 16 bearing a radially extending contact member 81. This contact member (see Figs. 4 and 5) is normally midway between two adjustable contacts 83, 83 in support 82 rigidly secured on clutch member 40ª.

These contacts 83 are far enough apart so that when clutch member 40ª, is engaged with 41ª and is therefore being oscillated by motor 69ª through link 62ª, neither of the screws 83 will quite reach contact member 81 on vertical shaft 16, and the assembly will therefore function as previously described for the assembly on the horizontal axis. If, however, frame member 1 is suddenly rotated as by coming about of the ship or other dirigible support on which the instrument is located, one or the other of the oscillating contacts 83 will be brought near enough to strike contact 81, which latter tends to hold its angular position in space by reason of the spinning gyro which operates to oppose rotation of shaft 16 from which 81 projects. Contact being made in this way is utilized to change the circuits so that brush 75, through which the vertical assembly is being energized, will be switched to the circuit of the horizontal assembly, while brush 74 on the non-conducting segment still connects with the horizontal assembly, thus stopping flow of current in magnet 54ª and releasing clutch 41ª.

Figure 9:
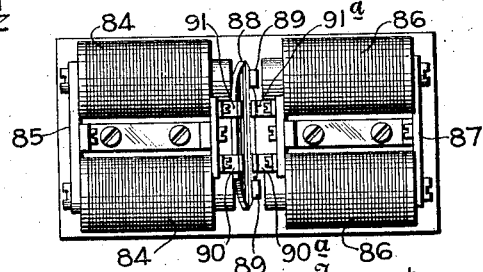
Fig. 9 is a top plan view of the relay or electro-magnetic double pole circuit changer which is for a purpose to be described below.

A double-pole relay switch for the above purpose is shown in Figs. 9, 10 and 11, as comprising two electro-magnets. These magnets have coils 84, 86 respectively, and between them is an armature 88 adapted to be attracted by either magnet and held in either position by spring contacts 90, 91 on the one side, and 90ª, 91ª on the other side. These contacts are terminals of circuits which will be described.

A desirable arrangement of circuits for performing all of the above described operations is shown in Fig. 12, which is a wiring diagram showing essential elements of the machine conventionally. These elements of the machine are identified by the same reference letters as used in Fig. 1.

Current from any suitable source is applied through wire $d$ and the return circuit is from the frame of the machine to the other terminal of the source.

Current flows through wire $d$ to branch $d^{11}$, conducting segment 71, brush 75, wire $d^{12}$, contact 90 of the relay, switch 88, contact 91, wire $d^{13}$, coil 54ª and wire $d^{14}$ to the frame of the machine. Simultaneously, current will be flowing through $d^1$, $d^{31}$, rheostat R¹, wire $d^{32}$, contacts 35ª and 34ª, motor 69ª and wire $d^{33}$ to the frame.

When segment 71 rotates out from under 75 and closes circuit through 74, the current will flow through wire $h$, relay coil 84, wire $h^1$, collector ring $h^2$, wire $h^3$, clutch magnet 54, wire $h^4$, to the frame of the machine. This will operate the clutch on the horizontal shaft closing contact 34 and 35, and starting motor 69 by current flowing through $d$, $d^1$, collector ring $d^2$, wire $d^3$, rheostat R, thence through $d^4$, 35, 34, $d^5$, 69, $d^6$ to the frame of the machine.

Passage of either brush 74 or 75 off of the conducting segment 71 of course releases the respective clutch members 40, 41 or 40ª, 41ª, thereby opening the corresponding motor switch 34, 35 or 34ª, 35ª.

If the frame 1 is rotated so as to bring either screw 83 in contact with 81 while the clutch 40ª is in, as first described, current will flow through $d^{12}$, $d^{20}$, relay magnet 86, $d^{21}$, $d^{22}$, contact 83, then through contact 81, to the frame of the machine. This will throw the relay switch into contact with 90ª, 91ª, thereby opening the circuit of magnet 54ª and releasing the clutch on the vertical axis, thus permitting the vertical shaft and the gyro carried thereby to maintain its position in the meridian plane instead of being rotated out of it by torque applied from frame 1 through the clutch 41ª. In this new position the current flowing through magnet 86 can return through wire $g$ to relay terminal 90ª, switch 88, terminal 91ª, wire $g^1$, thence through $h^1$, $h^2$, $h^3$ and horizontal clutch magnet 54, to the frame of the machine, thus making brush 75, which was the contact for the vertical magnet, now serve as contact for the horizontal magnet.

In this new position continued rotation of the commutator bringing brush 74 into circuit will throw relay switch 88 back to the initial position. If now the ship is still turning and the vertical frame 1 is still being rotated, 83 will again contact with 81 and again throw switch 88 to cut out vertical clutch magnet 54ª and cut in horizontal clutch magnet 54. But if and whenever circuit through 74 finds normal conditions restored and contactor 83 no longer closing circuit through 81, the vertical clutch will remain in; thereafter operating alternately with the horizontal clutch in the regular way first described.

The sizes of the parts and the scale on which the apparatus is to be constructed admit of very considerable variation. For apparatus such as shown herein, I have found that the gyroscopic energy furnished by an eight-pound wheel about five or six inches in diameter, rotating at, say, 7000 revolutions per minute; or of a seventeen-pound wheel rotating at 3000 to 6000 revolutions per minute, will be adequate. With respect to the sizes of operating parts, it will be noted that when the spinning axis is displaced 90° east or west, the available angular speed of the earth with reference to the direction in space of the spinning axis is one degree in four minutes. Hence springs 42, 42ª are designed and adjusted with reference to these numerical values, as will also the speed of the timer and the adjustment of the contacts for cutting out the vertical restriction, in response to sudden horizontal torques on the vertical axes.

There is nothing important about having the springs 42, 42ª, helical in shape; in fact a flat, spiral spring has been used and a straight one could be used and would be used where found easier for embodying the required qualities; and obviously two equal opposite springs could be used to respectively apply the desired equal opposite stresses.

It will be understood that accurate, easy-running ball bearings and lubricating means are provided for the spinning axle and also for the pivotal mountings, also that the rotor is carefully designed and adjusted for running balance as well as for static balance, all as is well known in this art. For my apparatus I prefer to employ for the spinning axle special bearings with lubricating means that cannot leak and which prevent the oil from flowing in directions to impair the balance when the spinning shaft is inclined or becomes vertical, but such device is the subject of my companion application, Serial No. 423,641, filed Nov. 12, 1920.

It will thus be seen that I have provided a true pole-seeking and pole-indicating gyroscopic compass. In order to put the same in use, the spinning axis can be in any position whatsoever. The driving motor is simply turned on and the spinning axis automatically seeks and within a short interval finds its position of stable equilibrium in the meridian plane, and either horizontal or parallel to the axis of the earth, in said plane, accordingly to which of the above described methods is employed. In the absence of externally applied force, it will remain in this position as long as it is kept spinning, regardless of which direction and how far the gyroscope may be moved either upon, above or below the surface of the earth. The compass will, therefore, accurately indicate north and south as well as latitude. In case of deflection by externally applied force, it is promptly and accurately restored to parallel which is its natural position of rest and in which it therefore gives consistent and correct indications of north and of the latitude of the place. In prior gyroscopic compasses the spinning axis is always being rotated by gravity to seek and maintain a horizontal plane, and therefore does not indicate latitude, and unless exactly upon the equator, it is continuously deflected from its position of parallelism in absolute space which it tries to maintain, with the result that even in normal operation these gyroscopes will precess continuously and will give neither a steady nor an accurate indication in the absence of special elaborate compensating appliances, and even with the best compensating appliances, the indications require various interpretations and corrections according to specially prepared mathematical tables. By my invention the fundamental cause of these disturbances is eliminated so that the need for such compensating apparatus and methods does not exist.

With reference to the speed of orientation, it will be seen that I have provided a simple and dependable gyro compass with approximately all of the advantages and with none of the disadvantages of a magnetic compass.

The device as shown in the drawings can be constructed and successfully operated for its intended purpose without any knowledge of the gyroscopic reactions involved and without knowledge of the movements of the gyroscope or the earth with respect to outer space. The detailed descriptions dealing with these facts and phenomena are for the purpose of indicating the broad scope of the invention, and the considerations that are to be kept in view in constructing and operating the many possible embodiments thereof.

Certain of these statements of principle, even if shown to be incomplete or erroneous in certain details, will nevertheless be sufficient for the purpose in view. They are intended to be suggestive of further inferences to be drawn by one skilled in the art.

Thus my present invention includes a non-pendulous, pole-seeking gyro-compass capable of serving the same purposes as that set forth in my prior application, Serial No. 361,257, filed February 25, 1920, as well as of my more recent application Serial No. 416,409, filed October 12, 1920. It is adapted for use as a parallel gyroscope unit in connection with other units in my "helm and position chart" as set forth in my application, Serial No. 351,236, filed January 13, 1920. In its relation to this latter application, my present invention may be considered as relating more particularly to means whereby the parallel gyroscope is made "pole-seeking" without subjecting it to the rotative influence of gravity and without the necessity for partial or full control of the parallel gyroscope by an auxiliary compass.

These improvements also render my present device available and suitable for use separately as a non-pendulous or gravity-free gyro-compass, or as embodied in and part of an automatic steering means for directing the course of a ship or other dirigible body or mechanism, and for various other purposes.

It is anticipated that repeating apparatus as for instance that fully described in my said application, Serial No. 351,236, filed January 13, 1920, may be combined with the devices set out in this and my companion application, previously referred to, for the purpose of utilizing the various indications to cause repetition or otherwise control other mechanisms near or remote from the instrument, and it is also anticipated that when intended for certain uses my devices may be combined with a support or platform suitably stabilized otherwise than by mere pendulous mounting in gimbals.

The terms "horizontal" and "vertical" as herein applied to the two pivotal mountings of the spinning axis specifically describe functionally desirable relations, the significant features being that the two mounting axes are at an angle to each other, preferably a right angle, and preferably in the same plane; also said axes always have a fixed-angle relation to the earth's vertical line in said plane.

Applying this to Fig. 1, it means that so long as the stationary frame 1 is maintained vertical, the axes Z and X could be shifted around in the plane of the paper, provided they are rigidly secured to said frame 1 in the new position and provided the balance in neutral equilibrium, against gravity, be preserved. They would still permit universal movement of the spinning axis to parallel, regardless of the latitude; and one or the other of these axes, would still be capable of transmitting any of the above described torques to the spinning axis. Obviously, however, there would be no direct reading of north and of the latitude by mere inspection of the pivot mountings and other arrangements would have to be devised for this purpose.

I claim:—

1. The method of modifying the effects of a slowly applied torque on a direction-indicating gyro, which method consists in actively and suddenly applying, continuing and removing relatively great, non-positive stresses in the same direction with said torque, and then in the opposite direction, alternately.

2. The method of preventing a direction-indicating gyro from yielding in the direction of a slow torque, which method consists in actively and suddenly applying, continuing and removing relatively great, non-positive stresses in the same direction with said torque, and then in the opposite direction, alternately.

3. The method of effectively applying a slowly developed torque on a direction-indicating instrument to produce effective precession at substantially right angles to the plane of said torque, which method consists in utilizing a local source of power to actively and suddenly apply alternating primarily-symmetrical, spring stresses in the same plane in which said slow torque is applied.

4. The method of orienting a gyro compass to the north and south or meridian plane, which method consists in affording said gyro three degrees of freedom, and approximately balancing the same in neutral equilibrium with respect to a horizontal axis of such freedom and utilizing a local source of power actively, resiliently and repeatedly, many times per minute, to apply and discontinue the available orienting torque with respect to said horizontal axis only, to cause precession against friction in said vertical axis, and then similarly operating on said vertical axis to produce vertical precession about said horizontal axis.

5. The method of orienting a gyro compass to the north and south or meridian plane, which method consists in affording said gyro three degrees of freedom, and approximately balancing the same in neutral equilibrium with respect to a horizontal axis of such freedom and utilizing a local source of power actively, resiliently and repeatedly, many times per minute, to apply and discontinue the available orienting torque with respect to said horizontal axis only, to cause precession against friction in said vertical axis.

6. The method of orienting a gyro compass to the north and south or meridian plane, which method consists in affording said gyro three degrees of freedom and approximately balancing the same in neutral equilibrium with respect to a horizontal axis of such freedom and utilizing a local source of power actively, repeatedly and many times per minute, to apply to, continue on and remove from the horizontal axis alternating sudden, relatively great spring stresses which are normally symmetric but adapted to become asymmetric and effectively orienting when the spinning axis is in a displaced position.

7. The method of orienting a gyro compass to the north and south or meridian plane, which method consists in affording said gyro three degrees of freedom and approximately balancing the same in neutral equilibrium with respect to a horizontal axis of such freedom and utilizing a local source of power actively, repeatedly and many times per minute, to apply to, continue on and remove from the horizontal axis alternating sudden, relatively great spring stresses which are normally symmetric but adapted to become asymmetric effectively orienting when the spinning axis is in a displaced position, and then similarly operating on said vertical axis to produce vertical precession about said horizontal axis.

8. The method of orienting a gyro compass to the north and south or meridian plane, which method consists in affording said gyro three degrees of freedom, and approximately balancing the same in neutral equilibrium with respect to a horizontal axis of such freedom, and utilizing a local source of power actively, repeatedly and many times per minute, to apply to, continue on and remove from the horizontal axis alternating sudden, relatively great spring stresses which are normally symmetric but adapted to become asymmetric and effectively orienting when the spinning axis is in a displaced position, and then similarly operating on said vertical axis to produce vertical precession about said horizontal axis, and timing said stressing operations to be on the respective axes at short intervals.

9. A gyro, means for spinning it and a mounting for the gyro affording approximately horizontal and vertical pivotal axes of angular movement of the spinning axis in combination with means including a spring for actively applying about said horizontal axis alternating spring stresses of such relatively great power and suddenness as to produce minimum movement or yield in the direction of said stresses.

10. A gyro, means for spinning it and a mounting for the gyro affording approximately horizontal and vertical pivotal axes of angular movement of the spinning axis in combination with means including a spring for actively applying about said horizontal axis alternating spring stresses of such relatively great power and suddenness as to produce precession about the vertical axis at substantially right angles to the plane of said torque.

11. A single unit gyro, means for spinning it, vertical and horizontal axial mountings on which said gyro is balanced and means applying relative movements resulting from earth's rotation for causing and permitting said gyro unit to precess to parallel with the earth's axis by power translated and applied by and through its own gyroscopic reactions.

12. In the combination specified by claim 11 the further feature of a clutch for one of said axes through which orienting stresses are applied to said axis to cause precession about the other axis; and means for engaging and releasing said clutch.

13. A gyro, means for spinning the same, and a mounting permitting angular displacement of the spinning axis from parallel with the earth's axis, in any direction, and return to parallel from such displaced position, in combination with means orienting the same by applying spring stress with respect to one axis only of such angular movements, to cause free precession about another axis of said mounting.

14. In the combination specified by claim 13 the further feature of means for applying and releasing the stress intermittently.

15. In the combination specified by claim 13 the further feature of means operating to apply and release the stress repeatedly, at intervals and for times predetermined independently of the precessional movements caused by the stress.

16. In the combination specified by claim 15 the further feature of a timer predetermining and controlling the duration of the intervals and times.

17. In the combination specified by claim 14 the further feature of means operating to apply an orienting stress about another axis of said mounting during intervals when said first mentioned stress is not operating.

18. In the combination specified by claim 15 the further feature of double acting stressing means adapted to apply the stress equally in either direction.

19. In the combination specified by claim 18 the further feature of means for continuously reversing the stress of said double acting resilient means.

20. In the combination specified by claim 13, the further feature of having the stressed axis horizontal.

21. In the combination specified by claim 17, the further feature of having one of said axes vertical.

22. In the combination contemplated by claim 21 the further feature of a normally inactive cut out operated by relative movement between the vertical pivot and its support, to discontinue the alternating torque on the vertical axis when the instrument support turns horizontally.

23. A gyro, means for spinning the same, and a mounting in which the gyro is balanced in approximately neutral equilibrium and which permits angular movement of the spinning axis to and from parallel with the earth's axis about two other axes, in combination with means for applying relatively powerful and sudden, symmetrically alternating stresses about one of said axes, to cause efficient precession about the other axis, and thereby to cause effective application of the torque derived from relative movement of the earth and the spinning axis, when the latter is in a non-parallel position.

24. In the combination specified by claim 23 the further feature of applying the torque with reference to two different axes of the mounting repeatedly, at different times, so as to cause movement toward parallel with the earth's axis, by repeated steps in different directions tending toward parallel.

Signed at New York, in the county of New York and State of New York, this 24th day of November, A. D. 1920.

CLIFFORD M. PAXTON.